United States Patent [19]
Vincent et al.

[11] Patent Number: 5,290,885
[45] Date of Patent: Mar. 1, 1994

[54] UNSATURATED ORGANIC ADDUCT OF AN ORGANOHYDROGENPOLYSILOXANE AS AN IMPROVED CROSSLINKING AGENT FOR SILICONE PRESSURE-SENSITIVE ADHESIVES

[75] Inventors: Gary A. Vincent, Midland; William P. Brady, Sanford, both of Mich.

[73] Assignee: Dow Corning Corporation, Midland, Mich.

[21] Appl. No.: 998,492

[22] Filed: Dec. 30, 1992

[51] Int. Cl.$^5$ ............................................ C09J 183/07
[52] U.S. Cl. ..................................... 525/478; 525/479
[58] Field of Search ........................................... 525/478

[56] References Cited

U.S. PATENT DOCUMENTS

| | | | |
|---|---|---|---|
| 3,929,704 | 12/1975 | Horning | 260/29.1 SB |
| 3,974,122 | 8/1976 | Sato et al. | 525/478 |
| 4,774,297 | 9/1988 | Murakami et al. | 525/478 |
| 4,831,080 | 5/1989 | Blizzard | 525/100 |
| 5,037,886 | 8/1991 | Blizzard | 525/105 |
| 5,100,976 | 3/1992 | Hamada et al. | 525/477 |

FOREIGN PATENT DOCUMENTS 355991 of 0000 European Pat. Off. .
145188 of 0000 Japan .

*Primary Examiner*—John C. Bleutge
*Assistant Examiner*—Margaret W. Glass
*Attorney, Agent, or Firm*—Alexander Weitz

[57] ABSTRACT

There is disclosed a silicone pressure-sensitive adhesive composition based on a siloxane resin component, a polydiorganosiloxane polymer component having unsaturated groups in its molecule, a silicon hydride-functional crosslinking agent and a hydrosilation catalyst, wherein the crosslinking agent is a reaction product of a cyclic or linear organohydrogenpolysiloxane and an unsaturated organic compound selected from alpha-alkenes having 6 to 28 carbon atoms or aromatic compounds having the formula Ph-$R^4$, wherein Ph represents a phenyl radical and $R^4$ is a terminally unsaturated monovalent hydrocarbon group having 2 to 6 carbon atoms.

28 Claims, No Drawings

UNSATURATED ORGANIC ADDUCT OF AN ORGANOHYDROGENPOLYSILOXANE AS AN IMPROVED CROSSLINKING AGENT FOR SILICONE PRESSURE-SENSITIVE ADHESIVES

FIELD OF THE INVENTION

The present invention relates to a silicone pressure-sensitive adhesive which comprises a resin component, a polymer component having unsaturated groups in its molecule a silicon hydride-functional crosslinking agent and a catalyst. More particularly, the invention relates to an improved silicone pressure-sensitive adhesive wherein said crosslinking agent is a reaction product of a organohydrogenpolysiloxane and an unsaturated organic compound.

BACKGROUND OF THE INVENTION

Silicone pressure-sensitive adhesives (hereinafter also referred to as PSAs) typically contain at least two primary components, namely a linear siloxane polymer and a tackifier resin consisting essentially of triorganosiloxane (M) units (i.e., $R_3SiO_{\frac{1}{2}}$ units, in which R denotes a monovalent organic group) and silicate (Q) units (i.e., $SiO_{4/2}$ units). In addition to the above two ingredients, silicone PSA compositions are generally provided with some crosslinking means in order to optimize various properties of the final adhesive product. In view of the high viscosity imparted by the polymer component, these PSA compositions are typically dispersed in an organic solvent for ease of application.

For example U.S. Pat. No. 3,929,704 to Horning teaches a silicone PSA comprising an MQ resin, silicone gum and a curing agent, wherein the curing agent is a peroxide admixed with a plasticizer and an extender. Alternatively, when the silicone polymer contains unsaturated groups in its molecule such silicone PSA compositions can be cured by incorporating an organohydrogenpolysiloxane and a hydrosilation catalyst. European Patent Application No. 355 991 to Minnesota Mining and Manufacturing Company is illustrative of such compositions. In this case, the polymer component comprises a diorganoalkenylsiloxy endblocked polydiorganosiloxane and a diorganohydrogensiloxy endblocked polydiorganosiloxane which allows the formation of a relatively low viscosity PSA composition without the need for a solvent.

The use of certain SiH-functional compounds in conjunction with non-silicone PSAs is also known. Japanese Patent Application No. Hei 4(1992)-145188 to Kanefuchi Chemical Industry Co., Ltd. discloses organic PSAs which are a blend of (A) an alkenyl group containing organic compound or organic polymer, (B) an organic compound containing at least two SiH groups in its molecule, (C) a hydrosilylating catalyst and (D) an organic adhesive resin.

Additionally, Blizzard et al., in U.S. Pat. No. 4,831,080, have demonstrated a method for improving the bond strength of a pressure-sensitive adhesive by contacting two PSA components to form a PSA construction. In this contribution to the art, the first component comprises a conventional PSA and a liquid organohydrogenpolysiloxane and the second component comprises the same PSA and a cure agent for the liquid organohydrogenpolysiloxane. A similar two-component PSA system is described in U.S. Pat. No. 5,037,886, also to Blizzard et al. In this case, the organohydrogenpolysiloxane is reacted with a siloxane resin before being incorporated into the first PSA component and a cure agent for this reaction product is mixed with the second component.

Although silicone PSAs of the prior art including some of the above described systems, do offer the industry considerable advantage over organic counterparts, there still remains room for improvement. Thus, for example, in a silicone pressure-sensitive tape which comprises a silicone PSA layer coated onto a plastic film (e.g., a self-wound tape), it is highly desirable to achieve the simultaneous properties of high adhesion, high tack and smooth adhesive release from substrates at high rates of peel. The latter characteristic is difficult to achieve with some silicone PSAs and an annoying noise, referred to as "chatter" herein, is noted when such a pressure-sensitive tape is unwound from a roll at relatively high speed. Aside from presenting a nuisance in numerous industrial operations, this "chatter" is associated with the unwanted transfer of adhesive from such a tape to the substrate contacted therewith (e.g., the back side of the tape in the previous example) during a rapid peel operation. Furthermore, the uneven adhesive release can be detrimental to process machinery since it can induce vibrations therein especially when a wide roll of tape (e.g., one to two meters) is being unwound.

SUMMARY OF THE INVENTION

None of the above described prior art, nor any other art known to applicants, suggests the preparation of silicone PSAs based on a siloxane resin component, a siloxane polymer component having unsaturated groups in its molecule a silicon hydride-functional crosslinking agent and a hydrosilation catalyst wherein said crosslinking agent is a reaction product of an organohydrogenpolysiloxane and an unsaturated organic compound as described infra. The silicone adhesives of the present invention exhibit good adhesion to metal and other substrates and have high tack surfaces. Moreover, it has surprisingly been found that, in addition to the above mentioned desirable characteristics, preferred silicone PSAs of the present invention provide a smooth adhesive release from substrates when delaminated therefrom at a high rate of peel. Thus, little or no adhesive is transferred to the substrate under these high peel rate conditions and the aforementioned "chatter" associated with prior art systems can be reduced or eliminated.

The present invention therefore relates to a silicone pressure-sensitive adhesive comprising a siloxane polymer having at least two olefinically unsaturated groups in its molecule, a siloxane resin, an SiH-functional crosslinking agent and a catalytic amount of a platinum group metal-containing catalyst, wherein said crosslinking agent is a hydrosilation reaction product of (I) an organohydrogenpolysiloxane selected from the group consisting of a cyclic siloxane having the formula

a linear siloxane having the formula

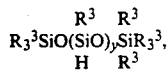

and a linear siloxane having the formula

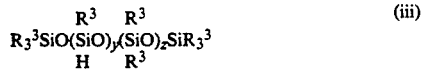

wherein $R^3$ is independently selected from the group consisting of alkyl radicals having 1 to 4 carbon atoms, a phenyl radical, a trifluoropropyl radical and a chloropropyl group x has an average value of 4 to 8, y has an average value of 5 to 25 and z has an average value of 1 to 20, with the proviso that $y+z \leq 25$; and (II) an unsaturated organic compound selected from the group consisting of an alpha-alkene having 6 to 28 carbon atoms and an aromatic compound having the formula Ph-$R^4$, wherein Ph represents a phenyl radical and $R^4$ is a terminally unsaturated monovalent hydrocarbon group having 2 to 6 carbon atoms.

DETAILED DESCRIPTION OF THE INVENTION

The silicone pressure sensitive adhesive compositions of the present invention comprise an organopolysiloxane (A), a polydiorganosiloxane (B), a crosslinking agent (C) and a silylation catalyst (D).

Component (A) of the present invention is a soluble organopolysiloxane resin consisting essentially of $R_3SiO_{\frac{1}{2}}$ siloxane units and $SiO_{4/2}$ siloxane units. By the term soluble it is meant that the organopolysiloxane can be dissolved, substantially completely in either a hydrocarbon liquid such as benzene, toluene, xylene, heptane and the like or in a silicone liquid such as cyclic or linear polydiorganosiloxanes. Preferably the resin is soluble in component (B), delineated below.

In the formula for component (A) R denotes a monovalent radical selected from the group consisting of hydrocarbon and halogenated hydrocarbon radicals, preferably having less than 20 carbon atoms, and most preferably having from 1 to 10 carbon atoms. Examples of suitable R radicals include alkyl radicals, such as methyl, ethyl, propyl, pentyl, octyl, undecyl and octadecyl; cycloaliphatic radicals such as cyclohexyl; aryl radicals such as phenyl, tolyl, xylyl, benzyl, alpha-methyl styryl and 2-phenylethyl; alkenyl radicals such as vinyl; and chlorinated hydrocarbon radicals such as 3-chloropropyl and dichlorophenyl.

To enhance the solubility of component (A) in component (B). described infra, it is desirable to select the predominant organic radicals of the former to match the predominant organic radical of the latter. Preferably, at least one-third, and more preferably substantially all R radical in the formula for component (A), are methyl radicals. The methyl radicals can be distributed in any desired arrangement among the $R_3SiO_{1/2}$ siloxane units; however it is preferred that each $R_3SiO_{\frac{1}{2}}$ siloxane unit bear at least one, and more preferably at least two, methyl radicals. Examples of preferred $R_3SiO_{\frac{1}{2}}$ siloxane units include $Me_3SiO_{\frac{1}{2}}$, $PhMe_2SiO_{\frac{1}{2}}$ and $Ph_2MeSiO_{\frac{1}{2}}$ where Me hereinafter denotes methyl and Ph hereinafter denotes phenyl.

Component (A) includes a resinous portion wherein the $R_3SiO_{\frac{1}{2}}$ siloxane units (i.e., M units) are bonded to the $SiO_{4/2}$ siloxane units (i.e., Q units), each of which is bonded to at least one other $SiO_{4/2}$ siloxane unit. Some $SiO_{4/2}$ siloxane units are bonded to hydroxyl radicals resulting in $HOSiO_{3/2}$ units (i.e., TOH units), thereby accounting for the silicon-bonded hydroxyl content of the organopolysiloxane, and some are bonded only to other $SiO_{4/2}$ siloxane unit. In addition to the resinous portion, component (A) can contain a small amount of a low molecular weight material comprised substantially of a neopentamer organopolysiloxane having the formula $(R_3SiO)_4Si$, the latter material being a byproduct in the preparation of the resin according to the methods of Daudt et al., described infra.

For the purposes of the present invention, component (A) consists essentially of $R_3SiO_{\frac{1}{2}}$ siloxane units and $SiO_{4/2}$ siloxane units in a molar ratio of 0.6 to 1.6, respectively. It is preferred that the mole ratio of the total M siloxane units to total Q siloxane units of (A) be between 1.1 and 1.4, most preferably about 1.1 to 1.3. The above M/Q mole ratios can be easily obtained by $^{29}Si$ nuclear magnetic resonance, this technique being capable of a quantitative determination of the molar contents of: M (resin), M(neopentamer), Q (resin), Q(neopentamer) and TOH. For the purposes of the present invention, as implicitly stated supra, the M/Q ratio {M(resin)+M(neopentamer)}/{Q(resin)+Q-(neopentamer)} represents the ratio of the total number of triorganosiloxy groups of the resinous and neopentamer portions of (A) to the total number of silicate groups of the resinous and neopentamer portions of (A).

It is further preferred that the resinous portion of component (A) have a number average molecular weight ($M_n$) of about 2.300 to 3,000 when measured by gel permeation chromatography (GPC), the neopentamer peak being excluded from the measurement In this molecular weight determination, narrow fractions of MQ resins are used to calibrate the GPC equipment, the absolute molecular weights of the fractions being first ascertained by a technique such as vapor phase osmometry.

Component (A) can be prepared by any method providing said method provides a soluble organopolysiloxane consisting essentially of $R_3SiO_{\frac{1}{2}}$ siloxane units and $SiO_{4/2}$ siloxane units. It is preferably prepared by the silica hydrosol capping process of Daudt, et al., U.S. Pat, No. 2,676,182; as modified by Brady, U.S. Pat. No. 3,627,851; and Flannigan, U.S. Pat. No. 3,772,247; each patent being incorporated herein by reference to teach how to prepare soluble organopolysiloxanes which meet the requirements of the present invention.

Briefly stated, the process of Daudt et al. used to prepare the preferred component (A) comprises limiting the concentration of the sodium silicate solution, and/or the silicon-to-sodium ratio in the sodium silicate, and/or the time before capping the neutralized sodium silicate solution to generally lower values than those disclosed by Daudt et al. in order to prevent excessive growth of the silica particles and to obtain a soluble organopolysiloxane having the preferred $M_n$. Thus, the preferred silicate concentration is generally limited to a value of 40 to 120, preferably 60 to 100, and most preferably about 75 grams/liter. The neutralized silica hydrosol is preferably stabilized with an alcohol, such as isopropanol and capped with $R_3SiO_{\frac{1}{2}}$ siloxane units as soon as possible, preferably within 30 seconds after being neutralized. The sodium silicate employed preferably has the formula $Na_2O \cdot xSiO_2$, wherein x has a value of 2 to 3.5.

The level of the silicon bonded hydroxyl groups on the organopolysiloxane component (A), may be reduced preferably to less than about 1 weight percent. This may be accomplished, for example, by reacting hexamethyldisilazane with the organopolysiloxane. Such a reaction may be catalyzed, for example, with trifluoroacetic acid. Alternatively, trimethylchlorosilane or trimethylsilylacetamide may be reacted with the organopolysiloxane, a catalyst not being necessary in this case.

Component (B) of the present invention is a polydiorganosiloxane having at least two olefinically unsaturated groups in its molecule. Preferably, this component is a polymer or copolymer having the general formula $R^1R^2_2SiO(R^2_2SiO)_nSiR^2_2R^1$ wherein each $R_2$ is a monovalent radical independently selected from the group consisting of hydrocarbon and halogenated hydrocarbon radicals and each $R^1$ denotes a radical selected from the group consisting of $R_2$ radicals and an OH radical. Examples of $R^2$ radicals include the hydrocarbon and halogenated hydrocarbon radicals delineated above for R, as well as monovalent hydrocarbon radicals which contain olefinic unsaturation, such as alkenyl and cycloalkenyl radicals, examples thereof being vinyl, allyl, butenyl, hexenyl cyclohexenyl and beta-cyclohexenylethyl. For the purposes of the present invention, at least two $R^2$ radicals of the above formula must contain olefinic unsaturation preferably in the form of alkenyl radicals having 2 to 14 carbon atoms. Component (B) can be comprised of a single polydiorganosiloxane or a mixture of two or more different polydiorganosiloxanes. It is preferred that at least 50% and preferably at least 85% of the $R^2$ radicals of component (B) are methyl radicals which radicals can be distributed in any manner in the polydiorganosiloxane. Further component (B) can comprise trace amounts of siloxane branching sites provided that it remains flowable. More preferably component (B) has the general formula $R''R'_2SiO(R'_2SiO)_nSiR'_2R''$ wherein each $R'$ independently denotes a methyl or phenyl radical at least 85 percent of which radicals are methyl, and each $R''$ denotes an alkenyl radical having 2 to 14 carbon atoms. Preferably, $R''$ is a vinyl radical.

The average values of the subscript n in the above formulas depend on the type of PSA being prepared. For formulations which include sufficient solvent to impart a practical working viscosity to the final PSA composition, the average value of n is typically greater than about 200. On the other hand, when preferred PSA compositions having less than about 2 weight percent volatile compounds are desired (i.e., "solventless" systems), the average value of n should be about 50 to about 200 in order to produce a final PSA having a practical working viscosity. For the purposes of the present invention, the volatile content of such a solventless system is determined by heating a two gram sample of the material to 150° C. for one hour and noting the weight of the residue. The average value of n used should preferably provide an organopolysiloxane component (B) having a viscosity at 25° C. of about 50 millipascal-seconds (50 centipoise) to about 100 kilopascal-seconds (100,000,000 centipoise), the viscosity being a function of the $R^2$ radicals on this polymer. For the preferred solventless systems, described infra, component (B) should have a viscosity of about 50 to 800 cP, preferably 200 to 500, when measured at 25° C.

Specific examples of polydiorganosiloxanes which are suitable for use as component (B) in the compositions of this invention include
$ViMe_2SiO(Me_2SiO)_nSiMe_2Vi$,
$ViMe_2SiO(Me_2SiO)_{0.95n}(MePhSiO)_{0.05n}SiMe_2Vi$,
$ViMe_2SiO(Me_2SiO)_{0.98n}(MeViSiO)_{0.02n}SiMe_2Vi$,
$Me_3SiO(Me_2SiO)_{0.95n}(MeViSiO)_{0.05n}SiMe_3$,
$PhMeViSiO(Me_2SiO)_nSiPhMeVi$, and
$PhMeViSiO(Me_2SiO)_{0.8n}(MePhSiO)_{0.1n}SiPhMeVi$,
wherein
Vi hereinafter denotes a vinyl radical.

Crosslinking agent (C) of the present invention is a reaction product of an organohydrogenpolysiloxane (I) and an unsaturated organic compound (II) and represents the major departure from conventional cure systems for silicone PSAs.

The organohydrogenpolysiloxane (I) used to prepare component (C) is either a cyclic siloxane having the formula

or a linear siloxane having the formula

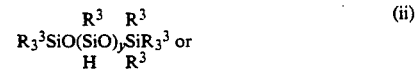

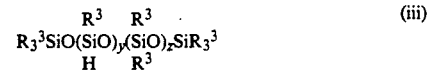

wherein $R^3$ is independently selected from the group consisting of alkyl radicals having 1 to 4 carbon atoms such as methyl, ethyl and propyl; a phenyl radical; a trifluoropropyl radical; and a chloropropyl group. In formulas (i), (ii) and (iii), x has an average value of 4 to 8, y has an average value of 5 to 20 and z has an average value of 1 to 20, with the proviso that $y+z \leq 25$. In preferred cyclic organohydrogenpolysiloxanes, each $R^3$ is matched with the organic radicals of components (A) and (B) and the average value of x is 5 to 7, most preferably 5. The preferred linear organohydrogenpolysiloxanes are represented by formula (ii) wherein y is 5 to 10 and each $R^3$ is similarly matched. Thus in highly preferred PSAs wherein the organic groups of both components (A) and (B) are predominantly methyl, $R^3$ is also methyl. The above described organohydrogenpolysiloxanes of the invention are well known in the art and many of these compounds are available commercially.

The unsaturated organic compound (II) used in the preparation of component (C) can be a linear or branched alpha-alkene having 6 to 28 carbon atoms. This compound is preferably selected from linear alkenes having the formula $CH_2=CH_2(CH_2)_mCH_3$ wherein m is 5 to 25, more preferably 9 to 25 and most preferably 9 to 15. When there are fewer than 6 carbons in the above alkene (e.g., when m=3), the improved smooth adhesive release of the PSA is not observed whereas, when there are more than about 28 carbon atoms in the alkene (e.g., when m=25), the amount of crosslinking agent needed to cure the PSA composition becomes too large in proportion to the components (A) and (B). However, even though unbranched alkenes having a total of 24 to 28 carbons result in crosslinking agents which can provide good adhesives, their generally waxy consistency is less desired since this imparts a greater viscosity to the final PSA formulation. Specific examples of preferred alpha-alkenes include 1-decene, 1-dodecene and 1-octadecene.

Alternatively, (II) can be an aromatic compound having the formula Ph-$R^4$, wherein $R^4$ is a terminally unsaturated monovalent hydrocarbon group having 2 to 6 carbon atoms. Preferably, unsaturated organic compound (II) is alpha-methylstyrene.

In order to prepare crosslinking component (C) of the present invention, organohydrogenpolysiloxane (I) and unsaturated organic compound (II) are reacted using a platinum metal-type catalyst, described infra, to promote the hydrosilation addition of the SiH functionality of the former to the unsaturation of the latter. This reaction is well known in the art and is typically conducted at temperatures in the range of about 100° to 150° C. either neat or in the presence of an inert organic solvent such as toluene or hexane. For the purposes of the present invention, the relative amounts of components used to form crosslinking agent (C) are such that, on a theoretical basis, at least 10 mole percent of the original SiH functionality present in the organohydrogenpolysiloxane (I) is reacted with the unsaturated organic compound (II) and the final reaction product contains 3 to 15 residual SiH groups. If more than about 15 SiH groups are left on the crosslinking agent, a PSA having low tack and adhesion results. On the other hand, when fewer than about 3 SiH groups remain, ineffective crosslinking ensues and cohesive strength of the PSA is low. It is preferred that the final crosslinking agent (C) contain 4 to 6 residual SiH groups per molecule and the ratio of (II) to (I) to be used in the above reaction can be calculated to approximate such a result.

The optimum relative amounts of components (A) and (B) that are used to form silicone PSA compositions according to the present invention are best determined by routine experimentation since adhesive performance is at least a function of the molecular weights of resin (A) and polymer (B). Typically, the proportions are such that from about 50 to 90 parts by weight of component (A) is used for every 100 parts by weight of components (A)+(B) based on non-volatile content.

In general, the crosslinking agent (C) is added in an amount sufficient to provide from 1 to about 15 silicon-bonded hydrogen atoms for each unsaturated radical in the composition. The preferred ratio depends on the type of composition. For example, preferred solventless PSAs of the invention employ a low molecular weight polymer and, in this case, the crosslinking agent is added in a sufficient amount to provide from 1 to 4 silicon bonded hydrogen atoms, most preferably 1.5 to 2.0. for every olefinically unsaturated radical in the composition. When the above ratio is below 1, poor crosslinking and cohesive strength result; when the ratio is above about 15, the resulting PSA has low tack and reduced adhesion.

The PSA compositions of the present invention additionally contain a platinum group metal-containing catalyst (D). These catalysts include all of the well known platinum and rhodium catalysts which are effective for catalyzing the reaction of silicon-bonded hydrogen atoms with silicon-bonded alkenyl radicals or hydroxyl radicals. In addition, complexes of the metals ruthenium palladium, osmium and irridium can be utilized. A preferred platinum-containing catalyst is a chloroplatinic acid-vinylsiloxane complex disclosed by Willing in U.S. Pat. No. 3,419,593, hereby incorporated by reference. Such platinum group metal-containing catalysts accelerate the reaction of component (B) with the crosslinking agent (C) and permit room temperature or low temperature curing of the composition. The platinum group metal-containing catalyst is added, e.g., in an amount sufficient to provide 0.1 to 1,000, preferably 1 to 500 and most preferably 10 to 300, parts by weight of platinum for each one million weight parts of the composition.

It is recommended that the instant PSA compositions also include a platinum catalyst inhibitor that is known in the art. Preferred platinum catalyst inhibitors include various "ene-yne" systems, such as 3-methyl-3-pentene-1-yne and 3,5-dimethyl-3-hexene-1-yne; acetylenic alcohols, such as 3-methyl-1-butyne-3-ol; 3,5-dimethyl-1-hexyne-3-ol, 3-methyl-1-pentyne-3-ol, and phenylbutynol; maleates and fumarates, such as the well-known dialkyl, dialkenyl and dialkoxyalkyl fumarates and maleates; cyclovinylsiloxanes; and benzyl alcohol. The platinum catalyst inhibitor can be used in any amount that will retard the above-described catalyzed addition reaction at room temperature while not preventing said reaction at elevated temperature; the proportion of this ingredient to be used may be readily determined by routine experimentation.

Curing of the compositions of this invention can be accomplished by heating at temperatures of up to 300° C. preferably at 80° to 150° C. for a suitable length of time.

In general, compositions of this invention are made by homogeneously mixing 50 to 90 parts by weight of component (A) and 10 to 50 parts by weight of component (B) in the presence of a non-reactive solvent. Solvents useful in the present invention include hydrocarbons, such as toluene, xylene, heptane, and mineral spirits; volatile siloxanes, such as octamethylcyclotetrasiloxane and hexamethyldisiloxane; halohydrocarbons, alcohols, esters, ketones and combinations of these solvents. The amount of solvent required depends on the viscosity of the polydiorganosiloxane, component (B). Higher viscosity polydiorganosiloxane polymers require more solvent than lower viscosity polydiorganosiloxane polymers to facilitate the preparation, handling and applying of the compositions. Suitable mixing means include a spatula, a drum roller, a mechanical stirrer, a three-roll mill, a sigma blade mixer, a bread dough mixer, and a two-roll mill. Component (C) may be mixed with (A) and (B) and the platinum catalyst inhibitor can be incorporated in this mixture. The platinum group metal-containing catalyst is preferably added last, or just prior to use.

The preferred solventless PSA compositions of the present invention may also be prepared by mixing the components in a solvent. Typically, component (A) is dissolved in about 5 to 15 weight percent of an organic solvent to facilitate mixing and component (B) is then added. When the viscosity of component (B) is low enough, mixing can be accomplished without the aid of a solvent (i.e., an essentially 100% solids PSA composition is also contemplated herein). To obtain a solventless composition of the present invention, the mixture of components (A), (B) and solvent is typically devolatilized under conditions equivalent to vacuum stripping at 130° C. and 1–2 millimeters of mercury in a batch operation. The removal of solvent can also be accomplished by any of the known techniques such as contact with a stream of inert gas, evaporation, distillation, thin film stripping, and the like. Excessively high temperatures should be avoided when components (A) and (B) or their mixtures are being devolatilized. A temperature of 200° C. and preferably 150° C. should not be exceeded. The crosslinking agent and catalyst are then added to the devolatilized mixture of (A) and (B) to complete the composition.

In general, small amounts of additional ingredients may be added to the compositions of this invention. For example, antioxidants, pigments, stabilizers, fillers, etc., may be added as long as they do not materially reduce the pressure sensitive adhesive properties of these compositions.

The compositions of this invention find utility as pressure sensitive adhesives and will readily stick to a solid support whether flexible or rigid. These compositions may be applied to a surface by any suitable means such as rolling, spreading, spraying, etc., and cured thereon as described above.

The surface of the support and the substrate to which the support is adhered may be any known solid material such as metals such as aluminum silver, copper, iron and their alloys; porous materials such as paper, wood, leather, and fabrics organic polymeric materials such as polyolefins, such as polyethylene and polypropylene; fluorocarbon polymers such as polytetrafluoroethylene and polyvinylfluoride; polystyrene; polyamides such as Nylon; polyesters and acrylic polymers; painted surfaces; siliceous materials such as concrete, bricks cinderblocks, and glass such as glass cloth, etc. Porous materials such as glass cloth are often impregnated with a substance that will prevent the migration of the silicone pressure sensitive adhesive from one surface to another surface of the support. In this regard it is also well known to chemically treat the surface of a flourocarbon polymer support to enhance the adhesion of the silicone pressure sensitive adhesive to said surface.

Useful articles which can be prepared with the silicone pressure sensitive adhesives of this invention include pressure sensitive tapes, labels, emblems and other decorative or informational signs, among others. An especially useful article is one comprising a flexible or rigid support that can withstand extreme temperatures, hot and/or cold, and carrying on at least one surface thereof the silicone pressure sensitive adhesives of this invention. Such an article makes full use of the stability at high temperatures and the flexibility at low temperatures that the silicone pressure sensitive adhesives of this invention possess.

EXAMPLES

The following examples are presented to further illustrate the compositions of this invention, but are not to be construed as limiting the invention, which is delineated in the appended claims. All parts and percentages in the examples are on a weight basis and all measurements were obtained at 25° C., unless indicated to the contrary.

Each of the adhesive formulations described infra was cast as a 1.5-2.0 mil (0.038-0.051 mm) film on 2.0 mil (0.051 mm) thick MYLAR ™ polyester sheets, the adhesive was cured by heating the coated sheets at 130° C. for 6 minutes and the cured PSA was evaluated according to the following procedures.

Adhesion (A)

Adhesion was measured by cutting the adhesive-coated sheets into one inch (25.4 mm) wide tape, rolling this pressure-sensitive tape onto a stainless steel panel with a five pound (2.270 g) roller and then pulling the tape from the panel at a 180 degree angle at a rate of 12 inches per minute (305 mm/min). The average force required to peel each film from the panel is reported in Newtons/meter (N/m).

Percent Adhesive Failure (AF)

When the above described adhesion test resulted in some adhesive transfer from the tape to the steel panel (i.e., some cohesive failure), the AF value represents the percent of the adhesive film remaining on the tape (i.e., AF=100% when no adhesive transferred to the panel; AF=0% when all of the adhesive transfers to the steel panel; intermediate values between these extremes were determined visually).

When a tape sample had an AF value of 100% by the above adhesion test method, the procedure was repeated at a high peel rate by manually pulling the tape off the panel as rapidly as possible. Although the actual pull rate was not determined, this procedure provided reproducible results. In this case, the AF value was determined as follows. The amount of adhesive failure was noted and given a value from zero to 10 (i.e., 10 when there was no adhesive transfer and zero when there was complete transfer to the steel panel. This adhesive failure value was then added to 100 to give the final AF value for a test sample. Thus, if there was no cohesive failure, a value of 10 was added to the original 100 to give a final AF value of 110. If the adhesive failed entirely in a cohesive manner during the high speed peel, a value of zero was added to the original 100 to give a final AF value of 100. Intermediate values of cohesive failure were treated in a prorated fashion. According to this rapid peel procedure, the adhesive/cohesive failure was observed to take on one of four forms:

(1) The first failure type resulted in at least some adhesive transfer to the steel panel (cohesive failure), generally about 50 to 100 percent of the tape areas being so affected.

(2) The second type of failure produced "chatter" lines which were about 1/16 inch (1.6 mm) wide and were distributed substantially uniformly along the length of the peeled tape. Usually such samples exhibited an AF value of 109 or, much less frequently, 108.

(3) The final failure type resulted in a single thin line at the very end of the tape after it was peeled from the steel panel. These samples were given a value of 109.5 in recognition of the very low level of cohesive failure.

(4) There was no adhesive transfer to the steel panel; AF=110.

Finger Tack (FT)

Finger tack is a relatively subjective evaluation and was obtained by touching the surface of the adhesive to determine the degree of "stickyness" thereof. Descriptive terms such as high (H), low (L) and average (A) are reported in the tables below.

Highly preferred formulations of the present invention simultaneously exhibit adhesion values of $\geq 50$ oz/in ($\geq 547$ N/m) and high FT values, as required of conventional silicone PSAs used in commercial applications, and, at the same time have AF values of at least 109.5.

EXAMPLE 1

An adhesive master batch was prepared by thoroughly mixing 201 g of a vinyl-terminated polydimethylsiloxane fluid having a number average molecular weight of about 11,000 with 600 g of a xylene solution of a soluble silicate resin. The resin, which was capped with hexamethyldisilazane, had a residual hydroxyl content of less than ¼ weight percent, a number average molecular weight of about 2,600 and consisted essentially of $Me_3SiO_{\frac{1}{2}}$ siloxane units and $SiO_{4/2}$ siloxane units in a molar ratio of 1.3:1, respectively. The molecular weight of the resin was obtained by gel permeation chromatography (GPC) using Varian TSK 4000+2500 columns at 35° C. and chloroform mobile phase at 1 mL/min. Narrow molecular weight fractions of a similar resin were used to calibrate the system. The above resin solution had a solids content of 90.5%, as determined by heating 1.0 g of the solution in an air oven at 150° C. for 1 hour. The mixture so formed was then devolatilized at 150° C./5 mm Hg for about one hour.

EXAMPLE 2

A crosslinking agent of the present invention was prepared by charging a 500 ml, 3-necked flask fitted with a mechanical stirrer, thermometer/temperature controller and an addition funnel with 100 g (0.333 mole) of a cyclic siloxane having the formula $(MeHSiO)_5$. The addition funnel was filled with a mixture of 41.86 g (0.355 mole) of alpha-methylstyrene (AMS) and 1.16 g of a platinum complex. This catalyst was a chloroplatinic acid complex of divinyltetramethyldisiloxane diluted with dimethylvinylsiloxy endblocked polydimethylsiloxane to provide 0.65 weight percent platinum prepared according to Example 1 of U.S. Pat. No. 3,419,593 to Willing. The cyclic siloxane was heated to 120° C., at which point heating was discontinued and the dropwise addition of the funnel contents was started. The AMS was added at such a rate that the reaction exotherm maintained the temperature of the flask contents at about 120° C. This addition step lasted 30 minutes, after which the reaction mixture was heated at 120° C. for an additional hour and was subsequently filtered. The resulting yellow liquid had a viscosity of 65 cS (65 mm²/s).

EXAMPLE 3

Seven gram portions of the adhesive master batch prepared in Example 1 were weighed into separate vials and additional vinyl-terminated polydimethylsiloxane fluid (or additional resin) as well as the crosslinking agent of Example 2 were blended therewith to achieve the resin/polymer (R/P) weight ratios and silicon hydride/vinyl on silicon (SiH/SiVi) molar ratios reported in the first and second columns of Table 1, respectively. Additionally, approximately 0.01 g of a bis-(methoxymethyl)ethyl maleate inhibitor and 0.06 g of the above described platinum complex catalyst solution were thoroughly mixed into each of these vials. Each such adhesive formulation was applied to sheets of polyester, cured and tested according to the above described methods, the results also being shown in Table 1.

TABLE 1

| R/P | SiH/SiVi | A | AF | FT | |
|---|---|---|---|---|---|
| 69 | 1.8 | 503 | 109.5 | HIGH | LINE AT END |
| 70 | 1.8 | 613 | 109 | HIGH | |
| 71 | 1.8 | 711 | 102 | HIGH | |

TABLE 1-continued

| R/P | SiH/SiVi | A | AF | FT | |
|---|---|---|---|---|---|
| 69 | 1.2 | 481 | 110 | HIGH | |
| 70 | 1.2 | 569 | 109.5 | HIGH | LINE AT END |
| 71 | 1.2 | 613 | 108 | HIGH | |
| 70 | 1.5 | 569 | 109 | HIGH | VERY FEW CHATTER LINES |
| 70 | 1.5 | 569 | 109 | HIGH | VERY FEW CHATTER LINES |
| 70 | 1.5 | 569 | 109 | HIGH | VERY FEW CHATTER LINES |

EXAMPLE 4

A series of crosslinking agents was prepared according to the method of Example 2, but on a smaller scale wherein the reaction was carried out in a one ounce (30 cc) vial. The mole ratio of AMS to $(MeHSiO)_5$ was varied as shown in the last column of Table 2. These crosslinking agents were used to prepare adhesives as in Example 3 wherein the R/P ratio was 70/30 and the SiH/SiVi ratio was 1.3. After being cured on polyester films, the adhesives were tested and the results are reported in Table 2.

TABLE 2

| A | AF | FT | AMS/(MeHSiO)₅ |
|---|---|---|---|
| 624 | 110 | HIGH | 1.0/1.0 |
| 678 | 108 | HIGH | 1.2/1.0 |
| 635 | 108 | HIGH | 1.4/1.0 |
| 678 | 105 | HIGH | 1.6/1.0 |
| 656 | 102 | HIGH | 1.8/1.0 |
| 503 | 100 | HIGH | 2.0/1.0 |

The above results indicate that for this particular system at a 70/30 resin/polymer ratio the preferred AMS/cyclic siloxane ratio is about 1.

EXAMPLE 5

A crosslinking agent was prepared as in Example 2 wherein 30.0 grams (0.1 mole) of $(MeHSiO)$. was reacted with 12.4 grams (1.05 mole) of AMS. Adhesives were prepared according to the methods of Example 3 using this crosslinking agent and these were tested as before, the results being presented in Table 3.

TABLE 3

| R/P | SiH/SiVi | A | AF | FT | |
|---|---|---|---|---|---|
| 68 | 1.8 | 394 | 104 | HIGH | |
| 69 | 1.8 | 558 | 99 | HIGH | SPOTS |
| 70 | 1.8 | 678 | 99 | HIGH | SPOTS |
| 68 | 1.2 | 459 | 109.5 | HIGH | LINE AT END |
| 69 | 1.2 | 602 | 107 | HIGH | |
| 70 | 1.2 | 678 | 99 | HIGH | SPOTS |
| 69 | 1.5 | 591 | 107 | HIGH | |
| 69 | 1.5 | 613 | 105 | HIGH | |
| 69 | 1.5 | 569 | 107 | HIGH | |

EXAMPLE 6

A crosslinking agent was prepared by reacting AMS and a linear siloxane having the structure $Me_3SiO(MeHSiO)_nSiMe_3$, wherein n had an average value of about 8, as described in Example 2. The proportions of the reactants used were: 50 gms of the linear siloxane (0.615 mole SiH); 38 g AMS (0.322 mole); and 0.2 g of the above described platinum catalyst. The solution exothermed within five minutes. This crosslinker was used to prepare and test adhesives as described in Example 3, the results being shown in Table 4.

TABLE 4

| R/P | SiH/SiVi | A | AF | FT | |
|---|---|---|---|---|---|
| 69 | 1.8 | 503 | 109 | HIGH | VERY FEW CHATTER LINES |
| 70 | 1.8 | 602 | 109 | HIGH | CHATTER LINES |
| 71 | 1.8 | 678 | 102 | HIGH | |
| 69 | 1.2 | 481 | 110 | HIGH | |
| 70 | 1.2 | 624 | 109 | HIGH | CHATTER LINES |
| 71 | 1.2 | 700 | 104 | HIGH | |
| 70 | 1.5 | 580 | 109 | HIGH | CHATTER LINES |
| 70 | 1.5 | 569 | 109 | HIGH | CHATTER LINES |
| 70 | 1.5 | 547 | 109 | HIGH | CHATTER LINES |

EXAMPLE 7

A crosslinking agent was prepared according to the methods of Example 2 wherein 30 g of (MeHSiO)$_5$ (0.10 moles) were reacted with 17.64 g of 1-dodecene (0.105 moles) using 2 drops of platinum catalyst complex. An exotherm was observed within one minute of combining the reactants. After the temperature began to drop, the product was placed in a 70° C. oven for an hour. This crosslinker was a colorless, clear liquid having a viscosity of about 10–15 cS (10–15 mm$^2$/s).

The above crosslinking agent was used to prepare adhesives according to the methods of Example 3 and the ratios of resin/polymer and molar ratio of SiH/SiVi are presented in Table 5, along with corresponding test results.

TABLE 5

| R/P | SiH/SiVi | A | AF | FT | |
|---|---|---|---|---|---|
| 69 | 1.8 | 536 | 110 | H | NO CHATTER LINES |
| 70 | 1.8 | 602 | 109.5 | H | LINE AT END, NO CHATTER LINES |
| 71 | 1.8 | 656 | 102 | H | SPOTS, CHATTER LINES |
| 69 | 1.2 | 558 | 109.5 | H | LINE AT END, NO CHATTER LINES |
| 70 | 1.2 | 635 | 109.5 | H | LINE AT END, SLIGHT CHATTER |
| 71 | 1.2 | 700 | 109.5 | H | LINE AT END, SLIGHT CHATTER |
| 70 | 1.5 | 602 | 109.5 | H | LINE AT END, NO CHATTER LINES |
| 70 | 1.5 | 602 | 109.5 | H | LINE AT END, NO CHATTER LINES |
| 70 | 1.5 | 580 | 109.5 | H | LINE AT END, NO CHATTER LINES |

EXAMPLE 8

The procedures of Example 7 were repeated using a crosslinking agent prepared by reacting 15.12 g of 1-dodecene (0.09 mole) with 16.67 g (0.205 equivalents of SiH) of a siloxane having the structure Me$_3$SiO(MeHSiO)$_n$SiMe$_3$, wherein n had an average value of about 8, using 0.03 g of the platinum complex catalyst. The crosslinking agent was capped in a bottle and heated at 75° C./18 hours. The adhesive formulation parameters and test results appear in Table 6.

TABLE 6

| R/P | SiH/SiVi | A | AF | FT | |
|---|---|---|---|---|---|
| 69 | 1.8 | 427 | 110 | HIGH | NO CHATTER LINES |
| 70 | 1.8 | 536 | 109 | HIGH | CHATTER LINES |
| 71 | 1.8 | 569 | 109 | HIGH | CHATTER LINES |
| 69 | 1.2 | 405 | 110 | HIGH | NO CHATTER LINES |
| 70 | 1.2 | 492 | 110 | HIGH | NO CHATTER LINES |
| 71 | 1.2 | 558 | 109 | HIGH | FEW CHATTER LINES |
| 70 | 1.5 | 481 | 109 | HIGH | FEW CHATTER LINES |

TABLE 6-continued

| R/P | SiH/SiVi | A | AF | FT | |
|---|---|---|---|---|---|
| 70 | 1.5 | 492 | 109 | HIGH | FEW CHATTER LINES |
| 70 | 1.5 | 492 | 109 | HIGH | FEW CHATTER LINES |

EXAMPLE 9

A crosslinking agent was prepared according to the methods of Example 2 wherein 30 g of (MeHSiO)$_5$ (0.1 mole) was reacted with 26.46 g of 1-octadecene (0.105 mole) using 0.03 g of the platinum complex catalyst. A rapid exotherm was observed wherein the temperature rose to 100° C. This reaction product was heated in a capped bottle (75° C./3 hours) and then used to formulate the adhesives shown in Table 7 according to the method outlined in Example 3. Test results obtained as described above, are also presented in Table 7.

TABLE 7

| SiH/SiVi | R/P | A | AF | FT | |
|---|---|---|---|---|---|
| 1.8 | 69 | 492 | 109.5 | H | NO CHATTER; LINE AT END |
| 1.8 | 70 | 591 | 107 | H | SPOTS; CHATTER |
| 1.8 | 71 | 656 | 107 | H | SPOTS; CHATTER |
| 1.2 | 69 | 481 | 110 | H | |
| 1.2 | 70 | 580 | 109.5 | H | SLIGHT CHATTER; LINE AT END |
| 1.2 | 71 | 678 | 109.5 | H | SLIGHT CHATTER; LINE AT END |
| 1.5 | 70 | 558 | 109.5 | H | NO CHATTER; LINE AT END |
| 1.5 | 70 | 569 | 109.5 | H | NO CHATTER; LINE AT END |
| 1.5 | 70 | 558 | 109.5 | H | NO CHATTER; LINE AT END |

EXAMPLE 10

The procedure of Example 9 was followed wherein the crosslinking agent was a reaction product of 30 g of (MeHSiO)$_5$ (0.1 mole) and 8.84 g of 1-hexene (0.105 mole) using 0.03 g of the platinum complex catalyst. An exotherm was observed after several minutes of mixing the reactants and the product was heated in a capped bottle (75° C./2 hours) and then used to formulate adhesives, as described above. The results are presented in Table 8.

TABLE 8

| SiH/SIVi | R/P | A | AF | FT | |
|---|---|---|---|---|---|
| 1.8 | 69 | 492 | 105 | H | NO CHATTER; ADHESIVE ISLANDS* |
| 1.8 | 70 | 503 | 109.5 | H | NO CHATTER; LINE AT END |
| 1.8 | 71 | 591 | 25 | H | |
| 1.2 | 69 | 470 | 109 | H | CHATTER; CHATTER LINES |
| 1.2 | 70 | 569 | 85 | H | CHATTER |
| 1.2 | 71 | 678 | 40 | H | CHATTER |
| 1.5 | 70 | 580 | 105 | H | CHATTER |
| 1.5 | 70 | 580 | 105 | H | CHATTER |
| 1.5 | 70 | 591 | 109 | H | SLIGHT CHATTER; LINES |

*Islands of adhesive isolated from one another.

EXAMPLE 11

The procedure of Example 9 was followed wherein the crosslinking agent was a reaction product of 30 g of (MeHSiO)$_5$ (0.1 mole) and 32 g of a mixture of C20-C24 alpha-alkenes (approximately 0.105 mole) using 0.03 g of the platinum complex catalyst. A mild exotherm was observed about 20 minutes after mixing the reactants and the product (a white wax) was heated in a capped bottle (75° C./18 hours) and then used to formulate adhesives, as described above. The results are presented in Table 9.

TABLE 9

| SiH/SiVi | R/P | A | AF | FT | |
|---|---|---|---|---|---|
| 1.8 | 69 | 536 | 109.5 | H | LINE AT END |
| 1.8 | 70 | 602 | 109.5 | H | LINE AT END |
| 1.8 | 71 | 645 | 108 | H | CHATTER LINES |
| 1.2 | 69 | 263 | 108 | H | SPOTS |
| 1.2 | 70 | 558 | 109.5 | H | LINE AT END |
| 1.2 | 71 | 624 | 109 | H | CHATTER LINES |
| 1.5 | 70 | 613 | 109 | H | VERY FEW CHATTER LINES |
| 1.5 | 70 | 613 | 109 | H | VERY FEW CHATTER LINES |
| 1.5 | 70 | 591 | 109 | H | VERY FEW CHATTER LINES |

EXAMPLE 12

The procedure of Example 9 was followed wherein the crosslinking agent was a reaction product of 15 g of $(MeHSiO)_5$ (0.05 mole) and 5.88 g of 1-octene (0.0525 mole) using 0.03 g of the platinum complex catalyst. An exotherm was observed within 5 minutes and the product was heated in a capped bottle at 75° C. and then used to formulate adhesives, as described above. The results are presented in Table 10.

TABLE 10

| SiH/SiVi | R/P | A | AF | FT | |
|---|---|---|---|---|---|
| 1.8 | 69 | 503 | 109.5 | H | LINE AT END |
| 1.8 | 70 | 536 | 109 | H | CHATTER LINES |
| 1.8 | 71 | 624 | 107 | H | SPOTS |
| 1.2 | 69 | 492 | 109.5 | H | LINE AT END |
| 1.2 | 70 | 569 | 109.5 | H | LINE AT END |
| 1.2 | 71 | 613 | 107 | H | SPOTS |
| 1.5 | 70 | 602 | 109 | H | CHATTER LINES |
| 1.5 | 70 | 602 | 109 | H | CHATTER LINES |
| 1.5 | 70 | 613 | 109 | H | CHATTER LINES |

(COMPARATIVE) EXAMPLE 13

Adhesives were prepared and tested according to the methods of Example 3 using a conventional crosslinking agent consisting essentially of a trimethylsiloxy-terminated polymethylhydrogensiloxane having an average degree of polymerization (DP) of about 80. The formulation parameters and test results are presented in Table 11.

TABLE 11

| R/P | SiH/SiVi | A | AF | FT |
|---|---|---|---|---|
| 69 | 1.8 | 438 | 100 | VERY LOW |
| 70 | 1.8 | 317 | 100 | VERY LOW |
| 71 | 1.8 | 284 | 100 | NONE |
| 69 | 1.2 | 383 | 40 | HIGH |
| 70 | 1.2 | 514 | 90 | AVG |
| 71 | 1.2 | 372 | 0 | HIGH |
| 70 | 1.5 | 525 | 90 | VERY LOW |
| 70 | 1.5 | 481 | 100 | VERY LOW |
| 70 | 1.5 | 536 | 90 | VERY LOW |

(COMPARATIVE) EXAMPLE 14

Adhesives were prepared and tested according to the methods of Example 3 using a conventional crosslinking agent consisting essentially of a polymethylhydrogensiloxane having the formula $Me_3SiO(MeHSiO)_nSiMe_3$ wherein n had an average value of about 8. The formulation parameters and test results are presented in Table 12.

TABLE 12

| R/P | SiH/SiVi | A | AF | FT | |
|---|---|---|---|---|---|
| 69 | 1.8 | 449 | 109 | AVG | CHATTER LINES |
| 70 | 1.8 | 503 | 109 | AVG | CHATTER LINES |
| 71 | 1.8 | 569 | 109 | LOW | CHATTER LINES |
| 69 | 1.2 | 438 | 100 | HIGH | |
| 70 | 1.2 | 514 | 100 | HIGH | |
| 71 | 1.2 | 602 | 100 | AVG | |
| 70 | 1.5 | 525 | 109 | AVG | CHATTER LINES |
| 70 | 1.5 | 503 | 109 | AVG | CHATTER LINES |
| 70 | 1.5 | 525 | 109 | AVG | CHATTER LINES |

That which is claimed is:

1. In a silicone pressure-sensitive adhesive comprising a siloxane polymer having at least two olefinically unsaturated groups in its molecule, a siloxane resin, an SiH-functional crosslinking agent and a catalytic amount of a platinum group metal-containing catalyst, the improvement comprising using as said crosslinking agent a hydrosilation reaction product of (I) an organohydrogenpolysiloxane selected from the group consisting of a cyclic siloxane having the formula

a linear siloxane having the formula

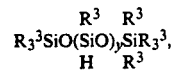

and a linear siloxane having the formula

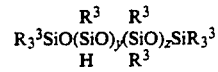

wherein $R^3$ is independently selected from the group consisting of alkyl radicals having 1 to 4 carbon atoms, a phenyl radical, a trifluoropropyl radical and a chloropropyl group, x has an average value of 4 to 8, y has an average value of 5 to 25 and z has an average value of 1 to 20, with the proviso that $y+z \leq 25$; and (II) an unsaturated organic compound selected from the group consisting of an alpha-alkene having 6 to 28 carbon atoms and an aromatic compound having the formula $Ph-R^4$, wherein Ph represents a phenyl radical and $R^3$ is a terminally unsaturated monovalent hydrocarbon group having 2 to 6 carbon atoms.

2. A silicone pressure-sensitive adhesive composition consisting essentially of:
(A) 50 to 90 parts by weight of a soluble organopolysiloxane consisting essentially of $R_3SiO_{\frac{1}{2}}$ siloxane units and $SiO_{4/2}$ siloxane units wherein each R denotes a monovalent radical selected from the group consisting of hydrocarbon and halogenated hydrocarbon radicals, at least $\frac{2}{3}$ of all R radicals being methyl and the mole ratio of $R_3SiO_{\frac{1}{2}}$ siloxane units to $SiO_{4/2}$ siloxane units in the soluble organopolysiloxane having a value of from 0.6 to 1.6;

(B) 10 to 50 parts by weight of a polydiorganosiloxane having the general formula $R^1R^2_2SiO(R^2_2SiO)_nSiR^2_2R^1$ wherein each $R^2$ denotes a monovalent radical independently selected from the group consisting of hydrocarbon and halogenated hydrocarbon radicals, at least ½ of all $R^2$ radicals being methyl, each $R^1$ denotes a radical selected from the group consisting of $R^2$ radicals and OH radicals, the subscript n has an average value of at least 50 and wherein at least two $R^2$ radicals contain olefinic unsaturation, the sum of components (A) and (B) being 100 parts by weight;

(C) a crosslinking agent which is a hydrosilation reaction product of (I) an organohydrogenpolysiloxane selected from the group consisting of a cyclic siloxane having the formula

a linear siloxane having the formula

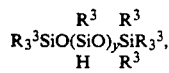

and a linear siloxane having the formula

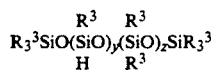

wherein $R^3$ is independently selected from the group consisting of alkyl radicals having 1 to 4 carbon atoms, a phenyl radical, a trifluoropropyl radical and a chloropropyl group, x has an average value of 4 to 8, y has an average value of 5 to 25 and z has an average value of 1 to 20, with the proviso that $y+z \leq 25$, and (II) an unsaturated organic compound selected from the group consisting of an alpha-alkene having 6 to 28 carbon atoms and an aromatic compound having the formula Ph-$R^4$, wherein Ph represents a phenyl radical and $R^4$ is a terminally unsaturated monovalent hydrocarbon group having 2 to 6 carbon atoms, the amount of (C) present in the composition being sufficient to provide from 1 to about 15 SiH groups for each olefinic radical in said composition; and (D) a curing amount of a platinum group metal-containing catalyst.

3. The composition according to claim 2, wherein component (A) consists essentially of $(CH_3)_3SiO_{\frac{1}{2}}$ siloxane units and $SiO_{4/2}$ siloxane units, $R^1$ and $R^2$ of component (B) are independently selected from the group consisting of methyl radical, phenyl radical and alkenyl radicals having 2 to 14 carbon atoms, at least 85 percent of said radicals being methyl there being at least two alkenyl radicals in each molecule of said component (B), the subscript n of said component (B) is a number having an average value of at least 50 and wherein each $R^3$ of said organohydrogenpolysiloxane (I) of said component (C) is a methyl radical.

4. The composition according to claim 3, wherein said alkenyl radicals of component (B) are vinyl radicals.

5. The composition according to claim 4, wherein said organohydrogenpolysiloxane (I) is represented by the formula

wherein Me denotes a methyl radical, x has an average value of 5 to 7 and said unsaturated organic compound (II) is alpha-methylstyrene.

6. The composition according to claim 5, wherein said soluble organopolysiloxane (A) has a silicon-bonded hydroxyl content of less than 1 percent by weight, based on the weight of soluble organopolysiloxane.

7. The composition according to claim 4, wherein said organohydrogenpolysiloxane (I) is represented by the formula

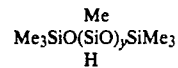

wherein Me denotes a methyl radical, y has an average value of 5 to 10 and said unsaturated organic compound (II) is alpha-methylstyrene.

8. The composition according to claim 7, wherein said soluble organopolysiloxane (A) has a silicon-bonded hydroxyl content of less than 1 percent by weight, based on the weight of soluble organopolysiloxane.

9. The composition according to claim 4, wherein said organohydrogenpolysiloxane (I) is represented by the formula

wherein Me denotes a methyl radical, x has an average value of 5 to 7 and said unsaturated organic compound (II) is represented by the formula $CH_2=CH_2(CH_2)_mCH_3$ wherein m is 5 to 25.

10. The composition according to claim 9, wherein said soluble organopolysiloxane (A) has a silicon-bonded hydroxyl content of less than 1 percent by weight, based on the weight of soluble organopolysiloxane.

11. The composition according to claim 4, wherein said organohydrogenpolysiloxane (I) is represented by the formula

wherein Me denotes a methyl radical, y has an average value of 5 to 10 and said unsaturated organic compound (II) is represented by the formula $CH_2=CH_2(CH_2)_mCH_3$ wherein m is 5 to 25.

12. The composition according to claim 11, wherein said soluble organopolysiloxane (A) has a silicon-bonded hydroxyl content of less than 1 percent by weight, based on the weight of soluble organopolysiloxane.

13. A solventless silicone pressure-sensitive adhesive composition consisting essentially of:
(A) 50 to 90 parts by weight of a soluble organopolysiloxane having a $M_n$ value of about 2,300 to 3,000 and consisting essentially of $(CH_3)_3SiO_{\frac{1}{2}}$ siloxane units and $SiO_{4/2}$ siloxane units in a mole ratio of 1.1/1 to 1.4/1, respectively;
(B) 10 to 50 parts by weight of a polydiorganosiloxane having the general formula $R^2{}_3SiO(R^2{}_2SiO)_n\text{-}SiR^2{}_3$ wherein $R^2$ is selected from the group consisting of methyl radicals, phenyl radical, and alkenyl radicals having 2 to 14 carbon atoms, with the proviso that at least two $R^2$ radicals per molecule are said alkenyl radicals and at least 85 percent of $R^2$ radicals are methyl, and n has an average value of 50 to 200, the sum of components (A) and (B) being 100 parts by weight;
(C) a crosslinking agent which is a hydrosilation reaction product of
(I) an organohydrogenpolysiloxane selected from the group consisting of a cyclic siloxane having the formula

a linear siloxane having the formula

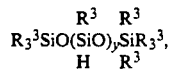

and a linear siloxane having the formula

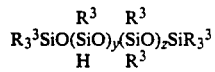

wherein $R^3$ is a methyl radical, x has an average value of 4 to 8, y has an average value of 5 to 25 and z has an average value of 1 to 20, with the provisor that $y+z \leqq 25$, and
(II) an unsaturated organic compound selected from the group consisting of an alpha-alkene having 6 to 28 carbon atoms and an aromatic compound having the formula $Ph\text{-}R^4$, wherein Ph represents a phenyl radical and $R^4$ is a terminally unsaturated monovalent hydrocarbon group having 2 to 6 carbon atoms, the product of (C) present in the composition being sufficient to provide from 1 to about 4 SiH groups for each alkenyl radical in (B);
(D) a curing amount of a platinum group metal-containing catalyst; and, optionally,
(E) an effective amount of an inhibitor for said catalyst (D).

14. The composition according to claim 13, wherein said alkenyl radical of component (B) is vinyl.

15. The composition according to claim 14, wherein said soluble organopolysiloxane (A) has a silicon-bonded hydroxyl content of less than 1 percent by weight, based on the weight of soluble organopolysiloxane.

16. The composition according to claim 15, wherein said organohydrogenpolysiloxane (I) of component (C) is a cyclic siloxane represented by the formula

wherein Me denotes a methyl radical and x has an average value of 5 to 7.

17. The composition according to claim 16, wherein said unsaturated organic compound (II) of component (C) is selected from the group consisting of alpha-methylstyrene and an alkene of the formula $CH_2=CH_2(CH_2)_mCH_3$ wherein m is 5 to 25.

18. The composition according to claim 17, wherein said catalyst (C) is a chloroplatinic acid-vinylsiloxane complex.

19. The composition according to claim 18, wherein said catalyst inhibitor is selected from the group consisting of diethyl fumarate and bis-(methoxymethyl)ethyl maleate.

20. The composition according to claim 9 wherein x is 5.

21. The composition according to claim 10, wherein x is 5.

22. The composition according to claim 16, wherein x is 5.

23. An article having on at least one surface thereof the cured composition of claim 2.

24. An article having on at least one surface thereof the cured composition of claim 13.

25. An article having on at least one surface thereof the cured composition of claim 17.

26. A pressure-sensitive adhesive tape comprising a flexible support having on at least one surface thereof the cured composition of claim 2.

27. A pressure-sensitive adhesive tape comprising a flexible support having on at least one surface thereof the cured composition of claim 13.

28. A pressure-sensitive adhesive tape comprising a flexible support having on at least one surface thereof the cured composition of claim 17.

* * * * *